United States Patent [19]
duPont

[11] Patent Number: 4,482,109
[45] Date of Patent: Nov. 13, 1984

[54] JET AIRCRAFT

[76] Inventor: Anthony A. duPont, 2300 Via Pacheco, Palos Verdes Estates, Calif. 90274

[21] Appl. No.: 270,578

[22] Filed: Jun. 4, 1981

[51] Int. Cl.³ .................. B64C 15/02; B64C 29/00
[52] U.S. Cl. ............................. 244/12.5; 244/15; 244/23 D; 244/52; 244/55
[58] Field of Search ............. 244/12.1, 12.5, 23 D, 244/23 R, 15, 52, 55, 130, 110 B; D12/326, 330, 342, 343

[56] References Cited

U.S. PATENT DOCUMENTS

| | | | |
|---|---|---|---|
| D. 174,404 | 4/1955 | Woods | D12/343 |
| D. 183,076 | 6/1958 | Zurawinski et al. | D12/342 |
| D. 186,251 | 9/1959 | Lantieri | D12/342 |
| D. 187,675 | 4/1960 | Zurawinski | D12/342 |
| D. 255,789 | 7/1980 | Bowers | D12/342 |
| 2,774,554 | 12/1956 | Ashwood et al. | 244/23 D |
| 2,874,922 | 2/1959 | Whitcomb | 244/130 |
| 3,087,303 | 4/1963 | Heinze et al. | 244/12.5 |
| 3,174,709 | 3/1965 | Alderson | 244/23 D |
| 3,285,537 | 11/1966 | Whittley | 244/12.5 |
| 3,292,864 | 12/1966 | Edkins | 244/23 D |
| 3,330,500 | 7/1967 | Winbom | 244/12.5 |
| 3,912,201 | 10/1975 | Bradbury | 244/23 D |
| 4,000,610 | 1/1977 | Nash et al. | 244/12.5 |

FOREIGN PATENT DOCUMENTS

| | | | |
|---|---|---|---|
| 1531390 | 4/1970 | Fed. Rep. of Germany | 244/12.5 |
| 1531029 | 5/1968 | France | 244/12.5 |

Primary Examiner—Galen L. Barefoot
Attorney, Agent, or Firm—Keith D. Beecher

[57] ABSTRACT

A jet aircraft is provided of the vertical or short take off and land (VSTOL) type which is a stable and controllable in all flight attitudes. The aircraft exhibits a high engine thrust/weight ratio which enables it to achieve shorter take-off, shorter landing distances and faster climbs as compared with prior art aircraft of the same general type. The aircraft includes two jet engines mounted side-by-side in its nose which assist in achieving smooth variation in cross-sectional area so that the area rule is not violated, and this enables efficient flight speeds in the sonic vicinity to be achieved. The exhaust of each engine of the aircraft is controlled by a thrust deflector and associated air foil array, the thrust deflector being deflected downwardly at an angle of substantially 75° to the horizontal aircraft center line during take-off so that the aircraft may take off and land vertically in a nose-high attitude with the engine inlets at the nose of the aircraft displaced up and away from the ground so as to prevent any ingestion through the inlets of forward moving air.

5 Claims, 9 Drawing Figures

STOWED (CRUISE)

45° DEGREES FORWARD

75° DEGREES FORWARD

Exhaust Reingestion

Nose High Altitude to Reduce or Eliminate Exhaust Reingestion

JET AIRCRAFT

BACKGROUND

Although aircraft exist in many forms and are adapted for diverse purposes, they all employ power to overcome aerodynamic resistance, termed "drag" thereby to achieve forward motion through the air. The air flowing over specially designated wing surfaces of the aircraft produce pressure patterns which are dependent upon the shape of the wing surface as well as upon the angle at which the air approaches the forward edge of the wing. The pressure patterns acting over the wing surface produce the lift forces necessary for flight. However, in order to achieve practical and controllable flight, the aircraft, in addition to having a source of thrust for overcoming drag, and of having an appropriate geometrical arrangement to produce lift, must include a control system capable of maneuvering the aircraft within prescribed limits of stability.

Since the advent of powered flight, it has been the goal of aeronautical engineers to be able to operate aircraft from any point on the earth's surface rather than being confined to long prepared runways at regular airports. Up until the present time, the only aircraft to accomplish this operationally are helicopters, and the AV-8A Harrier aircraft which uses deflected engine thrust for vertical lift. The Harrier is an excellent aircraft in most respects, but it is at a distinct disadvantage compared with conventional aircraft when it comes to carrying a load over an appreciable distance.

An important object of the present invention is to retain the vertical take-off and short field performance obtained with the deflected thrust of the Harrier aircraft, but by using certain design refinements hereinafter described to provide an aircraft which is capable of competing directly with conventional aircraft when it comes to carrying payloads over long distances. The design refinements, in addition to other benefits, permit the use of the more efficient high bypass turbofan jet engines.

The VSTOL aircraft of the present invention consists of a conventional wing, fuselage and tail assembly, but with the turbine engine or engines mounted in the nose, and with the exhaust of the engines exiting underneath the fuselage. This general arrangement permits the use of a swept wing and area ruling of the aircraft cross-section to achieve low drag at speeds very close to the speed of sound.

That is, the VSTOL aircraft to be described herein is constructed so that aerodynamic drag at the cruise condition is minimized, thereby reducing the required propulsion thrust for given flight conditions, and thereby making speeds near the sonic level feasible. The foregoing is achieved, as mentioned above, by mounting, for example, the two turbine engines of the aircraft closely adjacent to one another in the nose of the aircraft, and by providing for exhaust of the engines to be directly under the fuselage. Appropriate deflecting means are provided, as will be described, for controlling the direction of the exhaust from each engine. The assembly is mounted in the aircraft in conformance with the area rule so that the aircraft approaches the shape of lowest drag.

Two advantages of the present design are high cruising speed and low surface area, both of which contribute heavily to the efficient use of fuel, since fuel is consumed by the engine to overcome aircraft drag. Approximately half of an aircraft's drag in cruising flight is caused by the friction of the air passing over the aircraft surface. A reduction in surface area is therefore a reduction in drag in approximately the relationship of the percentage drag reduction being slightly over one-half the percentage reduction in surface area. Speed also improves aircraft fuel usage if it can be obtained without any increase in drag. The area rule feature of the aircraft of the invention, combined with a swept wing design, delays the formation of strong shock waves on the aircraft and thus permits higher speeds without an increase in drag. On important feature of the aircraft to be described herein is the ability to locate the engines so that their thrust can be deflected for take off and landing while still achieving an area rule, swept wing high speed configuration. Control forces adequate to maneuver the aircraft are inherently provided under all conditions under which the thrust vectoring system would be employed.

Additional lift for operation from short runways and the total lift for vertical take off and landing is obtained by a retractible turning cascade deflector which is placed in the engine exhaust stream for take off and landing. The cascade has a nozzle exit area greater than the normal engine exit area which is optimized for forward flight. Therefore, each engine can be matched to produce higher than usual thrust for deflected thrust operation. This differs from the Harrier and the Bell X-14 experimental aircraft where the same nozzle was used for vertical thrust and horizontal flight. Control is provided by directly vectoring the exhaust flow instead of by using bleed air jets as are used on the Harrier and Bell X-14. This feature enables the use of the more efficient high bypass turbofan jet engines which inherently do not provide sufficient bleed air for a bleed air control system.

DETAILED DESCRIPTION OF THE ILLUSTRATED EMBODIMENT

Figure 1:
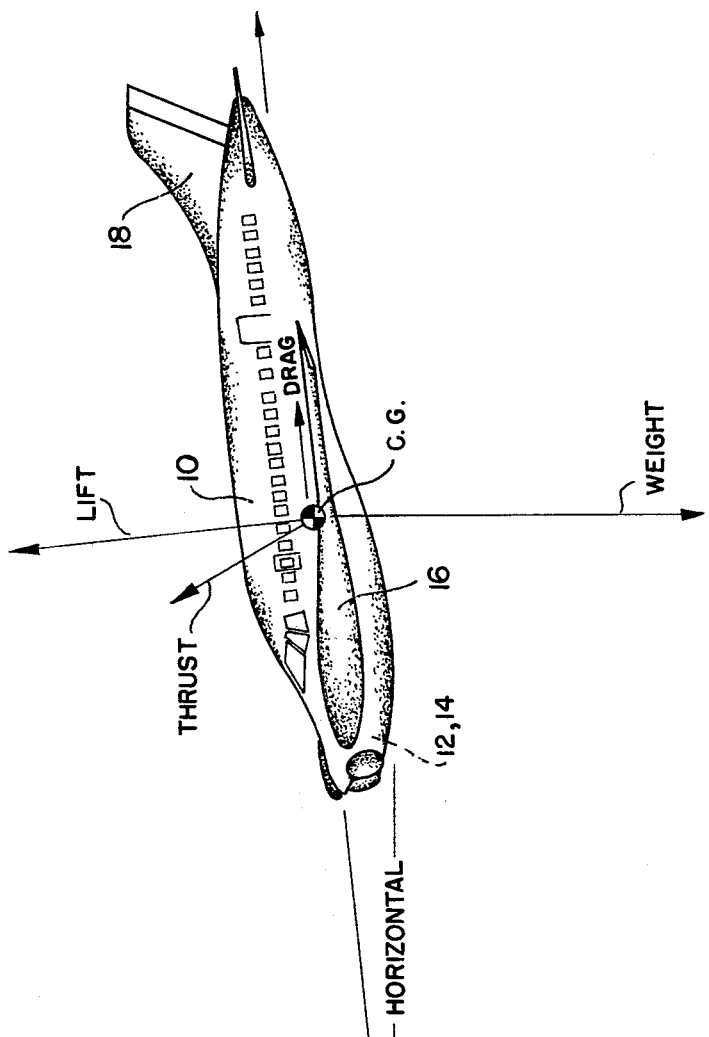
FIG. 1 is a side elevation of a two-engine aircraft which may be constructed to incorporate the concepts of the invention.

The aircraft illustrated in FIG. 1 is designated generally as 10, and it includes a pair of jet engines 12 and 14 mounted adjacent to one another in the nose of the aircraft. The mounting of the engines in the aircraft is achieved without bulging the contour of the aircraft, so that the contour may comply with the area rule.

Figure 3:
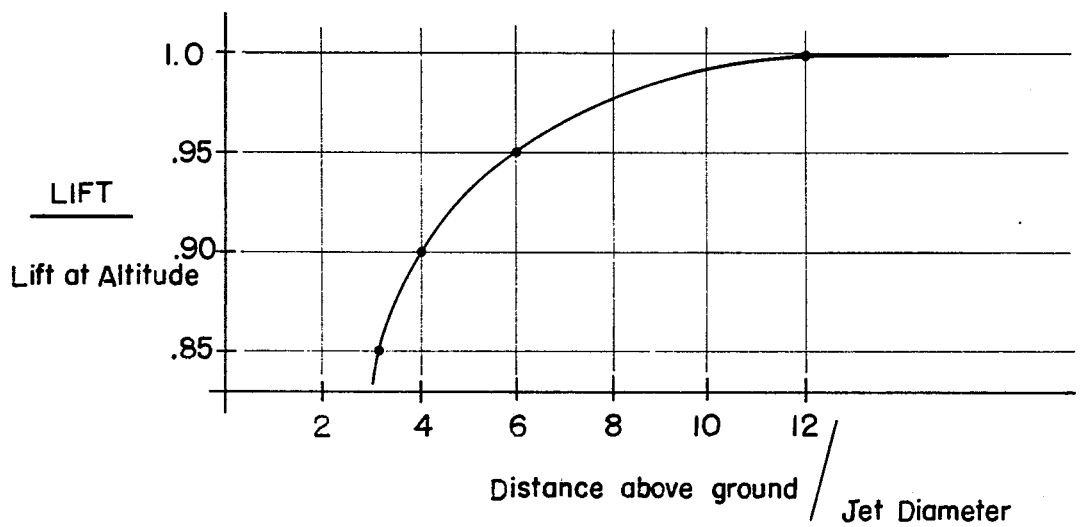
FIG. 3 is a curve showing the interaction between the lift of an STOL aircraft of the prior art type and the distance of the aircraft above the ground.

As is well known, the relationship known as area rule is based on the premise that drag is primarily a function of the longitudinal development of cross-sectional area of the aircraft. On the basis of the area rule, the transonic drag increment is reduced by shaping and mounting the aircraft components so that area development for the aircraft more nearly approaches the shape dictated by the area rule for the lowest drag. The magnitude of the drag associated with such a shape is greatly reduced by increasing the overall length and reducing the maximum cross-sectional area of the aircraft. The construction of the aircraft of FIG. 3 not only obviates any bulges in the contour of the aircraft, but reduces the maximum cross-sectional area to a minimum. This design is important since it makes efficient flight speed in the neighborhood of sonic speeds feasible.

The two engines 12 and 14 are mounted closely adjacent to one another in the nose of the aircraft in order to reduce dangerous asymmetrical thrust forces which occur at low speeds in most multi-engine prior art jet aircraft should one engine lose power for any reason. Specifically, the moments about the center of gravity of the aircraft are reduced by placing the engines closely adjacent to one another in the nose of the aicraft, so that the pilot can maintain control of the aircraft, enen though one of the engines should momentarily low its power.

The positioning of the two engines 12, 14 in the nose of the aircraft, as shown in FIG. 1, places the engines ahead of the center of gravity (designated C.G.) which for stability purposes, is also approximately the center of lift. The engines may be of the type manufactured by the General Electric Company, and designated as its TF34 High By-Pass Turbofan Jet Engine. This engine has the characteristics of very low fuel consumption and low exhaust noise level.

The aircraft of the invention includes a wing 16 and a tail 18. The wing 16 is a swept-back wing, whose forward edge is contoured to extend in a curved configuration outwardly and rearwardly from the nose of the aircraft. This wing may be similar to the super-critical wing developed by Dr. Richard Whitcomb of NASA Langley Research Center. This wing offers less drag at high speeds, and more lift at low speeds without leading edge slats. It also offers the ability to maintain lift at high angles of attack and greater wing thickness for light wing weight and greater fuel capacity.

All the aforesaid features are important in the VStol aircraft of the invention. In addition, the super-critical wing achieves low drag near the speed of sound which is also important in the design of the aircraft of the invention which is intended to be flown at speeds approaching sonic speed. This is achieved by delaying the formation of shock waves until the airflow approaches the trailing edge of the wing.

Figure 2A:
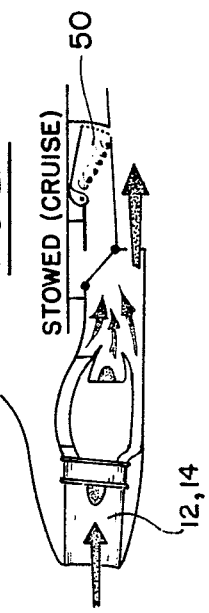
FIGS. 2A, 2B and 2C are schematic illustrations of a cascade thrust deflector which is associated with each engine of the aircraft of FIG. 1.
Figure 2B:
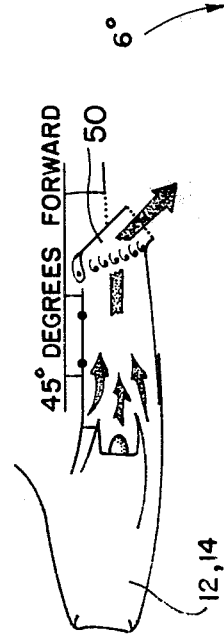
Figure 2C:
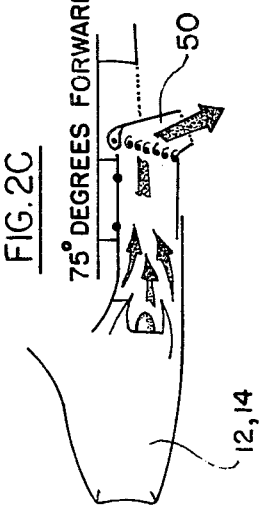

The VSTOL aircraft of the invention achieves a short landing distance by deflecting the engine thrust to provide additional lift. The thrust deflection mechanism is shown, for example, in FIGS. 2A-2C, which are representations of the thrust deflection cascade mechanism of the engine 12 or 14 in various positions. Deflection is achieved, for example, by a pivoted cascade thrust deflector 50 which during the normal cruise mode of the aircraft, is stored under the cabin floor, as shown in FIG. 2A. In this way, the cascade thrust deflector in no way distorts the contour of the aircraft during normal cruise conditions, so that compliance with the area rule is not affected thereby. When deflected thrust is desired, the cascade is turned into the engine exhaust stream by any appropriate control mechanism (not shown). As shown in FIGS. 2B and 2C, the deflection angle can be varied continuously from a thrust at 75° to the horizontal as shown in FIG. 2C, to 45° forward thrust as shown in FIG. 2B and reverse thrust (not shown). At transitional flight speeds between hover and normal forward flight, the combination of thrust vector control surfaces control the aircraft.

An important feature of the present invention is the cascade deflector which, as shown in FIG. 2C, establishes a 75° angle for vertical landing or take off, so as to permit the aircraft to assume a nose-high attitude, for reasons to be explained.

It was formly believed that an interaction between the downward deflected exhaust and the under surface of the aircraft existed and that this effect was increased as the aircraft approached the ground. This effect was observed on the X-14 experimental aircraft as it approached the ground vertically, and was theoretically justified as an interaction between the jet exhaust and the under surface of the aircraft (see for example, NASA publication SP-116, pages 163-176). A one-tenth scale model of the aircraft of the invention was tested in 1977 by the present inventor and showed a very similar result. The loss of lift as the aircraft approaches the ground was found to be similar to the curve shown in FIG. 3 which relates to the prior art Bell X-14 experimental aircraft.

Figure 4:
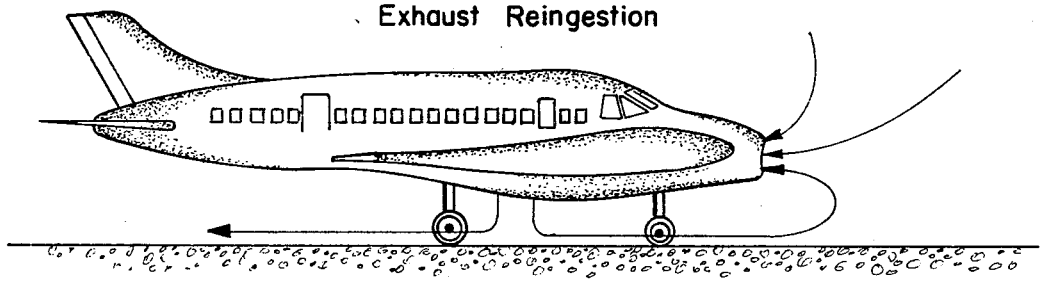
FIG. 4 is a schematic representation of a prior art STOL aircraft in its normal position upon landing or take off.

However, it was found that the loss in lift is not caused by interaction of the exhaust jet with the lower surface of the aircraft. Careful measurements of the pressure on the aircraft ower surface, of the exhaust momentum, of the net lift of the thrust of the engines, and of aircraft pitching moment showed that the loss in the lift was due to ingestion of forward moving air by the engine inlet. The ingestion of the exhaust flow traveling forward along the ground, as shown in FIG. 4, causes both a downward force on the inlet and a distortion of the engine flow that affects engine performance. As the aircraft rises vertically off the ground, the ability to ingest this forward flow decreases and the deleterious effect diminishes rapidly. The downward force on the inlet is caused by the asymmetrical air flow pattern where more air is ingested from the upper area ahead of the inlet than the lower because the lower air is moving forward and must be stopped and turned before entering the inlet. The asymmetrical flow pattern results in a net downward flow of air entering the inlet and the momentum change as the flow is turned to the engine axis causes a downward force on the inlet. The flow field is shown in FIG. 4. Further model testing in 1981 using a very accurate strain gage balance verified these results.

Figure 5:
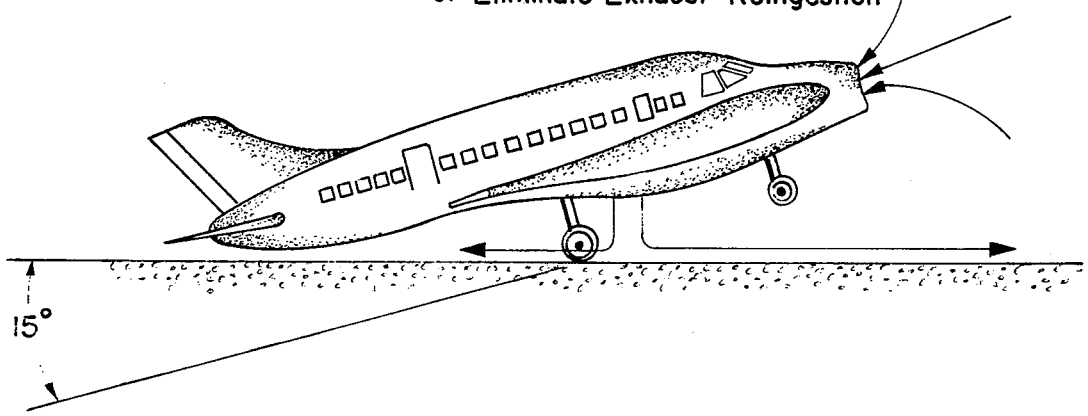
FIG. 5 is a diagram of the STOL aircraft of the present invention in its normal position for take off or landing with a nose-high attitude, rather than a horizontal attitude.

The aforesaid problem is solved in the aircraft of the present invention in which the thrust deflector cascade is designed with 75° of turning instead of 90°, as in the X-14. With such a construction, the aircraft of the present invention will take off and land vertically in a nose-high attitude with the engine inlets away from the ground, as shown in FIG. 5. The nose-high attitude requires an additional 15° of turning for any forward moving air that is reingested making it less likely that such air will be reingested. The 15° less turning in the thrust deflector increases the efficiency of the deflector cascade reducing losses from this source. The nose-high attitude is close to the wing angle of attack that produces maximum lift and there is the best attitude for transition between vertical, hovering, flight and forward flight.

The aforesaid construction permits locating the landing gear in its normal position with just enough length to rotate the aircraft through approximately 15° to get maximum lift on the ground. This is usual landing gear design practice of conventional aircraft. With a deflected thrust configuration it was formerly thought that a longer-than-usual landing gear would be necessary to reduce the lift loss near the ground, which practice was followed in the X-14 aircraft.

The only operational vertical take-off and landing (VTOL) aircraft, the AV-8A Harrier, uses a bleed air control system. This system is relatively simple and responsive, but it is costly in terms of performance because bleeding the engine to provide the required air for control reduces the available engine thrust. An object of the present invention is not only to provide control without the loss in thrust associated with bleed air controls, but in addition to rematch the engine for maximum static thrust and allow for center of gravity shifts with different payloads and fuel loads. This is accomplished by a rectangular exit for the engine flow and the deflector cascade 50 described above, which is deployed across the exit to deflect the flow approximately 75° for take off and landing.

Figure 6:
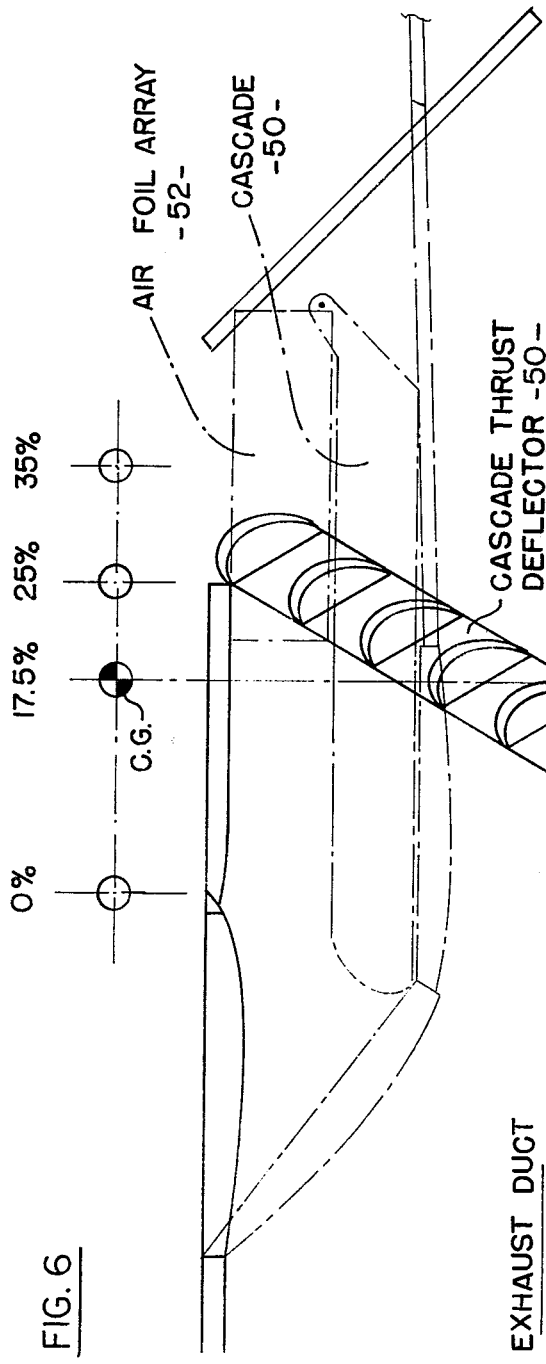
FIG. 6 is a schematic representation of the cascade thrust deflector of FIGS. 2A, 2B, 2C, and the associated air foil array.
Figure 7:
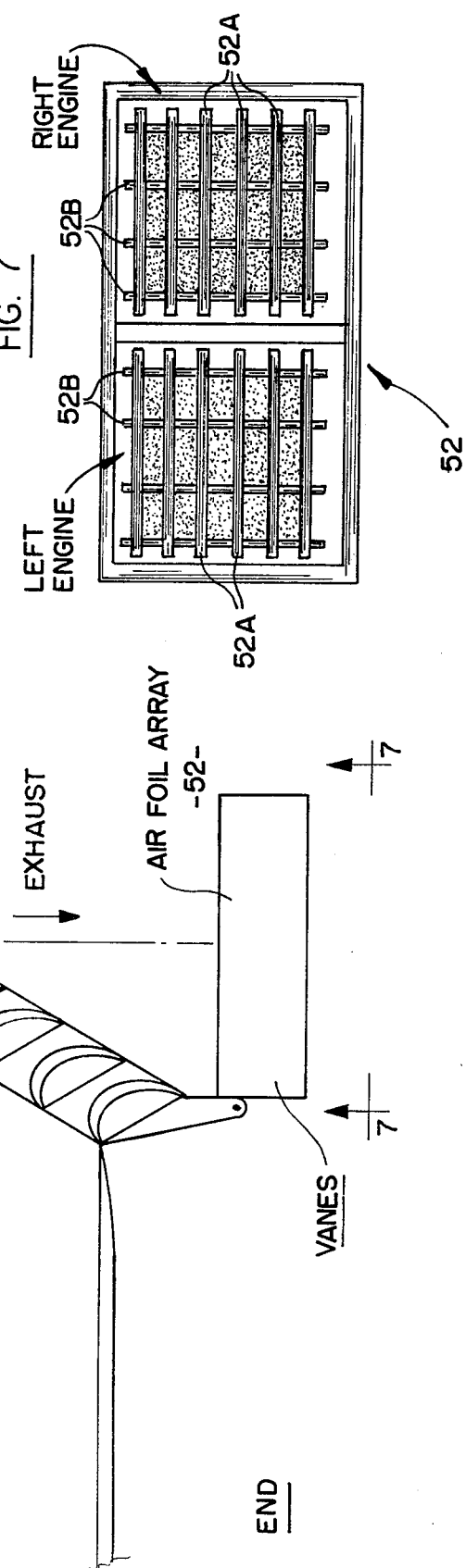
FIG. 7 is a front view of the array of FIG. 6, showing the vanes, or air foils included in the array.

Attitude control of the aircraft is achieved by an array 52 of air foils, or vanes, which is pivotally mounted to the cascade thrust deflector 50, as shown FIG. 6, in the exhaust duct of each engine. The schematic representation of FIG. 6 shows the thrust deflector array 52 in operating position (solid line) and stowed with the cascade 50 (broken line). The array 52 can be mounted so that it may be turned about two mutually perpendicular axes to vary the direction of the exhaust gases leaving the cascade 50. The vanes of the array 52 are shown in FIG. 7.

Instead of moving the entire array 52, the array itself may be fixed, and the vanes of the array may be turned by a suitable mechanism. Control in pitch, nose up or down, is accomplished by turning the vanes 52A of the air foil arrays 52 for both engines simultaneously. Sufficient control is available to provide control moments even when the center of gravity is shifted. Yaw control, nose left or right, is provided by turning the vanes 52A of the arrays of the two engines differentially while maintaining a net zero moment in pitch by having one of the arrays provide as much nose up moment as the other provides nose down moment. Combined pitch and yaw control may also be produced by the arrays 52. A single engine aircraft could be similarly controlled by having right and left air foil arrays adjacent to its cascade.

Roll control, right wing up or down, is provided by turning the arrays 52 associated with the two engines, or by turning the vanes 52B of the arrays, which as mentioned above are mounted in the arrays at right-angles to the first set of vanes 52A, and which provide a rolling moment about the aircraft's center of gravity.

By the array 52, control of the airplane is achieved by thrust vectoring, or changing the angle of the exhaust jet. When the aircraft is in equilibrium the thrust vector, a line of action along which the net thrust forces act, goes through the aircraft's center of gravity as shown in FIG. 6. Changes in the aircraft's attitude are accomplished by moving the thrust vector so that it passes at a distance from the center of gravity creating a moment which rotates the aircraft. When the desired attitude is attained the vector is moved so that it goes through the aircraft center of gravity stabilizing the aircraft in its new position.

The thrust vector can be moved so that it goes through the aircraft center of gravity at the proper angle even though the fore and aft center of gravity may change with different aircraft loadings. Center of gravity position fore and aft may change due to using up fuel, or loading of passengers or cargo. The angle of the thrust vector can be adjusted to maneuver the airplane and its location adjusted to accommodate various center of gravity positions by using a two pivot design in the aircraft plane of symmetry. One pivot axis is the pivot about which the cascade thrust deflector 50 rotates, and this is used to adjust the basic thrust vector angle. A second pivot axis, about which the control vanes 52A of FIG. 7 rotate, is used to control the thrust vector so that it always goes through the aircraft's center of gravity in equilibrium flight and to provide moments in order to adjust the aircraft's pitch attitude. The exhaust airflow closely follows the direction of the vane surfaces.

Thrust vector control in yaw is provided by differential movement in the arrays associated with the two engines of the vanes 52A used for pitch control. Differential movement causes the vector on one side to point aft and the other to point forward, thereby producing a yawing moment on the aircraft with the resultant vector still going through the aircraft's center of gravity. Roll control is provided by the second set of vanes 52B which are mounted at right angles to the first set. Rotation of vanes 52B displaces the thrust vector to the right or left of the center of gravity, inducing a rolling moment. When the thrust vector is 90° to the aircraft center line, as in hovering flight, the vane control system produces pure roll as the roll vanes 52B are turned, and pure yaw as the pitch vanes 52A are turned differentially.

At thrust vector angles other than 90° to the aircraft's center line there will be both a yawing and rolling moment produced by turning either the roll vanes 52B, or the pitch vanes 52A differentially. If this roll/yaw coupling is strong enough to be objectionable, it can be eliminated by a mixer which provides enough of the opposite roll or yaw control to eliminate roll/yaw coupling. The mixer is controlled by the thrust deflection angle and will provide enough opposite roll or yaw control to give pure roll or yaw motion in response to the pilot's control movement. For example, if the thrust is deflected through an angle less than 90°, a deflection of the roll vanes to lower the right wing will also yaw the aircraft to the right. The mixer will provide just enough differential movement of the pitch vanes to provide a nose left yawing moment to equal the nose right yawing moment of the roll vanes. A similar control motion correction is provided by the roll vanes 52B if a yawing control input is used.

The mixer accomplishes the correction by creating the proper roll correction in response to a yawing control motion or yaw correction due to a rolling control motion as a function of the cascade position as it is deflected from 90°. The mixer can either be electronic or mechanical. It is relatively straightforward to design because the corrections required are all functions of the cascade angle and the coupling is only a function of this angle. Thus the correction control input is always proportional to the basic roll or yaw vane motion and can be accomplished, for example, by levers in the cable control system which move in response to the cascade position. These levers would provide no coupling between roll and yaw at 90° and increasing interaction as the cascade moves away from 90°. Mixers of this nature are often used to control the relative displacement of spoilers and ailerons on swept-wing aircraft.

The force to turn the vanes 52A, 52B can be provided by hydraulic, penumatic or electrical servos. If the aircraft is small enough, the vanes may be controlled directly by the pilot through a cable system. A hydraulic system is usually preferred for most high performance aircraft, as it is a method selected to move the surface which prevents flutter. Generally a fail safe design is used where the control surface can be moved manually in the event of a complete hydraulic system failure if the aircraft is small enough to enable manual operation.

For vertical take-off and landing operations a rate damping system coupled into the control system is desirable. In such a system angular velocity is sensed by a rate gyro or fluidic sensor, and the controls automatically deflected to oppose the motion. This system has the effect of stabilizing the aircraft's attitude and resisting random disturbances.

The invention provides, therefore, an improved aircraft which may incorporate a swept-back wing with super-critical air foil sections to enable the aircraft to cruise at speeds approaching the speed of sound without incurring fuel consumption penalties. At high angles of attack, the wing planform and super-critical airfoil prevent loss of lift, and the tail location prevents the aircraft pitching up into an unstable region. The mounting of two engines in a side-by-side position in the nose of the aircraft assists in achieving a smooth variation in the aircraft cross-sectional area, which is necessary under the area rule for efficient flight near the speed of sound. The forward engine locations places the aircraft center of gravity near the nose, and thus reduces weight and drag, since it permits the tail to have relatively small surfaces. This placement of the aircraft engine also permits exhaust directly under the fuselage, for controlled deflection by an appropriate cascade.

The control deflection of the engine exhaust assures that the engine force always acts through the aircraft center of gravity, keeping the aircraft trimmer as the deflection angle is changed. In accordance with the invention, the cascade is constructed to be deflected to substantially 75° to the horizontal for a nose-high landing and take-off of the aircraft so that engine efficiency is maintained at all times, as described above.

Although a particular embodiment of the aircraft has been shown and described, modifications may be made. It is intended to cover all the modifications which come within the scope of the invention in the following claims.

What is claimed is:

1. An aircraft comprising: a fuselage, wing and tail assembly contoured to provide a smooth variation in cross-sectional area from the nose of the fuselage to the tail in accordance with the area rule, so that the fuselage approaches the shape of lowest drag at the cruising speed of the aircraft, the wing having a swept-back configuration with its forward edge extending outwardly and rearwardly from the nose of the fuselage on each side of the fuselage and exhibiting high lift at low speeds of the aircraft and low drag at the cruising speed of the aircraft; at least one jet engine positioned in the nose of the fuselage without bulging the contour of the aircraft so as to provide compliance with the area rule, the inlet of the engine being positioned in the nose of the fuselage and the exhaust of the engine exiting underneath the fuselage so that the thrust of the engine may be deflected for take-off and landing; a thrust deflector pivotally mounted to the underside of said fuselage and turnable between a retracted position completely within the confines of the fuselage displaced from the exhaust of said engine during normal cruising speeds of the aircraft, and an inclined position within the exhaust of the engine so as to deflect the exhaust through controllable angles to approximately 75° to permit the aircraft to take off and land vertically with nose-high attitude, said enging having a rectangular exit for the exhaust flow and said thrust deflector having a nozzle exit area greater than the normal exit area of the engine, and an airfoil array pivotally mounted to said thrust deflector to be movable with the thrust deflector to a retractable stowed position completely within the fuselage and to an operating position in the exhaust of the engine, said array being controllable to vary the direction of the engine exhaust leaving the thrust deflector about two mutually perpendicular axes so as to control the attitude of the aircraft.

2. The aircraft defined in claim 1, and which includes a second jet engine positioned in the nose of the fuselage beside and closely adjacent to the first-named jet engine; and a second thrust deflector for the second engine pivotally mounted to the underside of the fuselage adjacent to the first-named thrust deflector.

3. The aircraft defined in claim 1, in which said airfoil array contains a first plurality of vanes respectively rotatable about a first plurality of parallel axes, and a second plurality of vanes respectively rotatable about a second plurality of parallel axes perpendicular to the first plurality.

4. The aircraft defined in claim 3, and which includes a second jet engine positioned in the nose of the fuselage beside and closely adjacent to the first-named jet engine; a second thrust deflector for the second jet engine pivotally mounted to the underside of the fuselage adjacent to the first-named thrust deflector; and a second airfoil array pivotally mounted to the second thrust deflector to be movable with the second thrust deflector to a retracted stowed position completely within the fuselage and to an operating position in the exhaust of the second jet engine, said second array being controllable to vary the direction of the exhaust from the second engine leaving the second thrust deflector about two mutually perpendicular axes so as to cooperate with said first airfoil array in controlling the attitude of the aircraft.

5. The aircraft defined in claim 4, in which said second airfoil array contains a first plurality of vanes respectively rotatable about a first plurality of parallel axes, and a second plurality of vanes respectively rotatable about a second plurality of parallel axes perpendicular to the first plurality of axes.

* * * * *